United States Patent [19]

Matsumoto et al.

[11] Patent Number: 5,362,795
[45] Date of Patent: Nov. 8, 1994

[54] PROCESS FOR PRODUCING RUBBER-CONTAINING GRAFT COPOLYMER PARTICLES

[75] Inventors: Koji Matsumoto; Masaru Morimoto; Susumu Hirano, all of Otake, Japan

[73] Assignee: Mitsubishi Rayon Company, Ltd., Tokyo, Japan

[21] Appl. No.: 32,000

[22] Filed: Mar. 16, 1993

[30] Foreign Application Priority Data

Mar. 19, 1992 [JP] Japan ................. 4-062985

[51] Int. Cl.$^5$ ............. C08L 51/00; C08L 51/04; C08L 55/02
[52] U.S. Cl. ................. 524/501; 525/80; 525/83; 525/84; 525/85
[58] Field of Search .............. 524/501, 500, 504, 515, 524/523, 525, 284; 525/84, 83, 85, 934, 78, 80

[56] References Cited

U.S. PATENT DOCUMENTS

| | | | |
|---|---|---|---|
| 3,494,784 | 2/1970 | DeCoene et al. | 427/222 |
| 4,097,553 | 6/1978 | Novak | 525/80 |
| 4,275,178 | 6/1981 | Yusa et al. | 525/71 |
| 4,463,131 | 7/1984 | Grandzol et al. | 525/76 |
| 4,476,266 | 10/1984 | Maeda et al. | 525/83 |
| 4,522,964 | 6/1985 | Lindner et al. | 525/80 |
| 5,306,763 | 4/1994 | Matsumoto et al. | 524/501 |

FOREIGN PATENT DOCUMENTS

| | | |
|---|---|---|
| 0066382 | 12/1982 | European Pat. Off. . |
| 0346853 | 12/1989 | European Pat. Off. . |
| 0418685 | 3/1991 | European Pat. Off. . |
| 0506036 | 9/1992 | European Pat. Off. . |
| 2445352 | 7/1980 | France . |
| 64-26644 | 1/1989 | Japan . |
| 2044779 | 10/1980 | United Kingdom . |

*Primary Examiner*—James J. Seidleck
*Assistant Examiner*—M. L. Warzel
*Attorney, Agent, or Firm*—Oblon, Spivak, McClelland, Maier & Neustadt

[57] ABSTRACT

Rubber-containing graft copolymer particles having excellent powder properties are prepared by mixing, with 100 parts by weight (as solid content) of a slurry of a rubber-containing graft copolymer (A), 0.1 to 10 parts by weight (as solid content) of a rigid non-elastic polymer (B) having a glass transition temperature of 40° C. or higher and a weight-average molecular weight of 10,000 to 500,000 in a substantially slurry state.

8 Claims, No Drawings

PROCESS FOR PRODUCING RUBBER-CONTAINING GRAFT COPOLYMER PARTICLES

BACKGROUND OF THE INVENTION

1. Field of the Invention

The present invention relates to a process for producing rubber-containing graft copolymer particles having excellent powder properties and which can be used for improving the impact resistance of rigid resins, such as polyvinyl chlorides, polystyrenes, polymethyl methacrylates, and acrylonitrile-styrene copolymers, and other resins known as "engineering plastics", such as polycarbonates, PET, PBT, and polyacetals.

2. Description of the Related Art

It is well known to blend a rubber-containing graft copolymer with rigid resins, such as polyvinyl chlorides, polystyrenes, polymethyl methacrylates, and acrylonitrile-styrene copolymers, and other resins called "engineering plastics", such as polycarbonates, PET, PBT, and polyacetals to improve the impact resistance of these resins. The rubber-containing graft copolymer is obtained, usually as particles or powders, generally by subjecting a latex prepared by emulsion polymerization to coagulation with an acid, a salt, or the like and then dehydrating and drying the coagulated particles.

However, the particles are likely to give rise to such problems that the particles will cause blocking during the storage thereof and that transportation lines of the particles will be clogged with the particles due to their poor fluidity. Further, when the rubber content in the rubber-containing graft copolymer is increased to sufficiently improve the impact resistance of the resin with which the graft copolymer is blended, the problems mentioned above will inconveniently become more serious.

Accordingly, with the recent trend toward automation in measuring the amounts of powders and of the oversizing of transportation lines, improvements in the powder properties such as blocking resistance and powder fluidity of the graft copolymers are urgently required.

Reflecting this situation, various processes have been investigated to improve the powder properties of rubber-containing graft copolymer particles. For instance, there are known a process in which finely powdered silica, sodium carbonate, calcium carbonate, titanium dioxide, or one of various metallic soaps is added to the powder particles of a rubber-containing graft copolymer, and a process as disclosed in Japanese Unexamined Patent Publication No. 64-26644 in which a lubricant is added to such particles or powders.

These processes, however, are accompanied by serious problems in that the improvement in the powder properties is insufficient, or that while a satisfactory improvement in the powder properties is observed, the effect of the rubber-containing graft copolymer on the improvement of the impact resistance is decreased, and the processability, transparency, and thermal stability of powder blends or final products thereof become poor.

Alternatively, a process has been disclosed in Japanese Examined Patent Publication No. 58-48584 (and corresponding British Patent No. 2,044,779) in which a graft copolymer having a low rubber content used for improving the powder properties is mixed with another graft copolymer having a high rubber content in a slurry state.

According to this process, however, the effect of the polymer mixture on the improvement of powder properties remains insufficient, although the physical properties of the graft copolymer having a high rubber content will not be adversely affected by the mixing, since the graft copolymer used for improving the powder properties contains a rubber component.

Further, the Japanese Examined Patent Publication No. 58-48584 (and corresponding British Patent No. 2,044,779) have disclosed, in their Comparative Example 3, a specific example where a polyvinyl chloride resin is blended with a modifier for improving an impact resistance (hereinafter referred to as impact modifier) prepared by mixing, in a slurry state, with a rubber-containing graft copolymer, a rigid non-elastic, two-stages polymer which contains no rubber component and is prepared by polymerizing a mixture of styrene and methyl methacrylate at a first stage and polymerizing methyl methacrylate at a second stage. However, the specific example shows that when such a two-stages polymer is mixed in a slurry state with a rubber-containing graft copolymer to form a modified rubber-containing graft polymer, many fish eyes are unfavorably produced when the modified graft polymer is blended with a polyvinyl chloride resin, and the level of impact resistance of the polyvinyl chloride resin to be expected will be lowered, indicating that the effect of the mixed rubber-containing graft copolymers on the improvement of the impact resistance of a resin to which the graft copolymers are blended is insufficient.

In addition, Japanese Unexamined Patent Publication No. 58-1742 (and corresponding U.S. Pat. No. 4,463,131) have disclosed that a rigid non-elastic polymer in a slurry state is mixed with a rubber-containing graft copolymer. The publications also have specifically disclosed the use of a copolymer having a molecular weight of 1,000,000 and comprised of methyl methacrylate component and ethyl acrylate component at a weight ratio of from 99:1 to 80:20. As long as such a copolymer is used, however, sometimes problems arise, similar to those described in Comparative Example 3 of the Japanese Examined Patent Publication No. 58-48584 mentioned above, that when the modified rubber-containing graft copolymer is blended with a polyvinyl chloride resin, fish eyes are unfavorably produced and that the impact resistance is lowered.

Further, Japanese Examined Patent Publication No. 61-57341 (and corresponding U.S. Pat. No. 4,097,553) have disclosed that a rigid non-elastic polymer is mixed with an acrylic rubber-containing graft copolymer in a slurry state to form a modified acrylic rubber-containing graft copolymer. As in the process mentioned above, however, this process will have defects such as fish eyes being produced when the modified graft copolymer is blended with a polyvinyl chloride resin, and the impact resistance being lowered.

As described above, it is a current situation that a process has not been found whereby the powder properties can be sufficiently improved without producing fish eyes and without impairing the impact strength, transparency, processability or thermal stability when a rubber-containing graft copolymer is blended as an impact modifier with a resin to which the graft copolymer is intended to blend.

SUMMARY OF THE INVENTION

As a result of the research and development to obtain an impact modifier having no such problems as mentioned above, it has been found that the expected result can be achieved by mixing a rigid non-elastic polymer having a specific glass transition temperature (hereinafter referred to as Tg) and a weight-average molecular weight (hereinafter referred to as Mw) with a rubber-containing graft copolymer in a specific state or condition.

The present invention provides a process for producing rubber-containing graft copolymer particles having excellent powder properties, comprising mixing, with 100 parts by weight (as solid content) of a slurry of a rubber-containing graft copolymer (A), 0.1 to 10 parts by weight (as solid content) of a rigid nonelastic polymer (B) having a Tg of 40° C. or higher and having a Mw of 10,000 to 500,000 in a substantially slurry state.

The purpose of the present invention can more effectively achieved by adding a latex of a rigid non-elastic polymer (B) to a slurry of a rubber-containing graft copolymer (A) and then subjecting the latex to coagulation in the presence of the slurry for achieving the purpose of mixing the non-elastic polymer (B) with the graft copolymer (A) in a slurry state.

DESCRIPTION OF THE PREFERRED EMBODIMENTS

The rubber-containing graft copolymer (A) which can be used in the present invention includes a copolymer prepared by emulsion polymerizing a monomer or monomer mixture which forms a rubber component and acts as a backbone polymer, in an amount of 40 to 95% by weight, preferably 50 to 90% by weight, based on the whole weight of the rubber-containing graft copolymer to be obtained, to form a rubber latex, and then graft polymerizing monomers which form a rigid non-elastic polymer in an amount of 5 to 60% by weight, preferably 10 to 50% by weight, based on the whole weight of the rubber-containing graft copolymer to be obtained, in one stage or in multi-stages in the presence of the rubber latex.

The polymer which forms the rubber component acting as the backbone polymer includes a diene polymer such as a polymer of butadiene, isoprene, or chloroprene; an acrylic ester polymer such as a polymer of butyl acrylate or 2-ethylhexyl acrylate; polyorganosiloxane polymer; or copolymer thereof with other monomer copolymerizable therewith. Further, the polymer which forms the rubber component includes a polymer which was crosslinked when producing the polymer by using a crosslinking agent and also includes a polymer having a polymerization degree which was controlled by using a chain transfer agent.

The other copolymerizable monomer includes an aromatic vinyl compound such as styrene and α-methyl styrene; a methacrylate such as methyl methacrylate, ethyl methacrylate, and butyl methacrylate; an acrylate such as methyl acrylate, ethyl acrylate, butyl acrylate, and 2-ethylhexyl acrylate; a vinyl cyanide compound such as acrylonitrile and methacrylonitrile.

The crosslinking agent includes divinylbenzene, ethylene glycol dimethacrylate, and 1,3-butylene glycol dimethacrylate, and as the chain transfer agent, there may be used t-dodecyl mercaptan, n-dodecyl mercaptan, and n-octyl mercaptan.

Next, the monomer to be grafted onto the rubber component acting as the backbone polymer includes an aromatic vinyl compound such as styrene and α-methyl styrene; a methacrylate such as methyl methacrylate, ethyl methacrylate, and butyl methacrylate; an acrylate such as methyl acrylate, ethyl acrylate, butyl acrylate, and 2-ethylhexyl acrylate; a vinyl cyanide compound such as acrylonitrile and methacrylonitrile; and a vinyl halide such as vinyl chloride and vinyl bromide. These monomers may be used alone or in combination of two or more thereof. Graft polymerization can be carried out in one stage or in multi-stages.

Further, a crosslinking agent and a chain transfer agent may be used when the graft polymerization is performed. As the crosslinking agent and chain transfer agent, the compounds mentioned above can suitably be used.

Typical examples of the rubber-containing graft copolymer (A) used in the present invention include MBS, ABS, MABS, AAS, AES, and MES resins and a polyorganosiloxane rubber graft polymer, but the graft copolymer (A) is not restricted to these resins or polymer in the practice of the present invention.

Next, the rigid non-elastic polymer (B) to be added to a rubber-containing graft copolymer (A) is explained in detail.

In the description hereinafter, a polymer mixture in which a rubber-containing graft copolymer (A) is mixed with a rigid non-elastic polymer (B) is referred, for convenience, as "a modified rubber-containing graft copolymer".

The rigid non-elastic polymer (B) used in the present invention has a Tg of 40° C. or higher and preferably of 60° C. or higher. When the rigid non-elastic polymer has a Tg of lower than 40° C., the effect of the rigid polymer (B) in improving the powder properties of a rubber-containing graft copolymer is unfavorably low.

When the rigid non-elastic polymer (B) used in the present invention has a Tg of 40° C. or higher, either one stage polymer or multi-stage polymer may be used satisfactorily.

Mw of the rigid non-elastic polymer (B) is 10,000 to 500,000 and preferably 50,000 to 350,000. When the Mw is less than 10,000, the effect in improving the powder properties of a rubber-containing graft copolymer is unfavorably low. On the other hand, when the Mw exceeds 500,000, many fish eyes will unfavorably be produced in a resin composition to be finally obtained when a modified rubber-containing graft copolymer is blended, for example, with a polyvinyl chloride resin.

The chemical composition of the rigid non-elastic polymer (B) is not particularly restricted. However, examples of preferable monomers include a methacrylate such as methyl methacrylate, ethyl methacrylate, and butyl methacrylate; an acrylate such as methyl acrylate, ethyl acrylate, butyl acrylate, and 2-ethylhexyl, acrylate; an aromatic vinyl compound such as styrene and α-methyl styrene; and a vinyl cyanide compound such as acrylonitrile and methacrylonitrile. Among these monomers, methyl methacrylate, ethyl acrylate, butyl acrylate, and styrene are preferably used in particular.

The rigid non-elastic polymer (B) used in the present invention can be obtained by an emulsion polymerization. As an emulsifying agent, a known agent can be used which include an anion surface active agent such as a fatty acid salt, alkylsulfuric ester salt, alkylbenzenesulfonate, alkylphosphoric ester salt, and dialkylsulfosuccinate; and a nonionic surface active agent such as a polyoxyethylene alkylether, polyoxyethylene fatty ester, sorbitan fatty ester, and glycerine fatty ester, and further, a cationic surface active agent such as an alkylamine salt.

In the practice of the present invention, the rigid non-elastic polymer is added in an amount (as solid component) of 0.1 to 10 parts by weight, preferably 0.5 to 5 parts by weight, more preferably 1 to 3 parts by weight to 100 parts by weight (as solid content) of a rubber-containing graft copolymer (A) in slurry state. When the amount of the polymer (B) to be added is less than 0.1 part by weight, the effect in improving the powder properties of a rubber-containing graft copolymer is unsatisfactorily small. On the other hand, when the amount exceeds 10 parts by weight, the effect of the rubber-containing graft copolymer in imparting the impact resistance is unpreferably lowered.

Next, the method for mixing a rigid non-elastic polymer (B) with a rubber-containing graft copolymer (A) is described. In order to obtain a rubber-containing graft copolymer particles having excellent powder properties, it is essential to mix a rigid non-elastic polymer (B) in a slurry state with a slurry of a rubber-containing graft copolymer (A). As a method for mixing the polymers, there are mentioned a method in which a slurry of a rubber-containing graft copolymer (A) and a slurry of a rigid non-elastic polymer (B) which is prepared in a step separate from that for the slurry of the graft copolymer (A) are mixed; and a method in which a latex of a rigid non-elastic polymer (B) is mixed with a slurry of a rubber-containing graft copolymer (A), the latex is coagulated in the slurry to form an additional slurry and thereby the polymer (B) and the graft copolymer (A) are eventually mixed in a slurry state. In the practice of the present invention, the latter method is preferable.

The latex of a rigid non-elastic polymer (B) used in the present invention contains a solid component preferably in an amount of 20% by weight or less, more preferably in an amount of 15% by weight or less to achieve the purpose of the present invention more effectively.

In the present invention, it is very important that a rubber-containing graft copolymer (A) is not a latex, but a slurry. Thus, even if a latex of a rubber-containing graft copolymer (A) is added to a latex or slurry of a rigid non-elastic polymer (B), the effect in improving the powder properties of a rubber-containing copolymer can scarcely be achieved.

While the reason cannot definitely be explained, it is supposed that small slurry particles of a rigid non-elastic polymer (B) cover the surface of slurry particles of a rubber-containing graft copolymer (A), the rigid non-elastic polymer particles function as a sort of a roller to decrease the stickiness between the slurry particles of the rubber-containing graft copolymer and thereby the powder properties of the graft copolymer (A) are improved. That is, if a rubber-containing graft copolymer was in a state of latex, particles of a rigid non-elastic polymer are supposed to be taken in the particles of the rubber-containing graft copolymer at the time of coagulation, even when the rigid non-elastic polymer is added in a state of latex or slurry to the latex of the rubber-containing graft copolymer; the amount of the rigid non-elastic polymer particles which cover the surface of the rubber-containing graft copolymer particles will be extremely reduced; and thus the effect in improving the powder properties of the rubber-containing graft copolymer will become very small.

The modified rubber-containing graft copolymer of the present invention is added, as an impact modifier in a ratio of 1 to 40 parts by weight, to 100 parts by weight of a non-elastic rigid resin, such as a polyvinyl chloride resin, chlorinated polyvinyl chloride resin, polystyrene resin, polymethyl methacrylate resin, and acrylonitrile-styrene copolymer resin and other resins of various types such as a polycarbonate resin, PET, PBT, and polyacetal.

According to a process for producing rubber-containing graft copolymer particles of the present invention, the powder properties such as powder fluidity and blocking resistance of a rubber-containing graft copolymer can be improved without sacrifice of the effect of the graft copolymer in improving the impact resistance and without producing serious amounts of fish eyes, making it possible to cope with the current trend of the automatic weighing of polymer particles and oversizing of transportation lines.

Next, the present invention will be described in more detail with reference to Examples. However, it should be understood that the present invention is by no means restricted to the Examples. In the Examples and Comparative Examples, "part(s)" indicates "part(s) by weight" unless otherwise specified.

Evaluations in Examples and Comparative Examples were conducted in the following ways:

1. Glass transition temperature Tg:

Glass transition temperature of a rigid non-elastic polymer was calculated by the following equation described in the "Polymer Handbook":

$$\frac{1}{Tg} = \frac{W_1}{Tg_1} + \frac{W_2}{Tg_2}$$

wherein $W_1$ and $W_2$ are the weight ratio of polymerized monomer components, and $Tg_1$ and $Tg_2$ are glass transition temperature of homopolymers of the monomer components, respectively.

2. Weight-average molecular weight Mw:

Weight-average molecular weight of a rigid non-elastic polymer was determined by means of Shimazu Liquid Chromatography (Apparatus: LC-6A, Column GPC-8025, 804, 805) using a solution prepared by dissolving 0.2 g of a sample polymer in 100 ml of tetrahydrofuran.

3. Powder fluidity:

Fifty g of sample resin powders were introduced in a bulk density measuring instrument used in the procedure according to JIS-K-6721, and the fluidized state of the powders when the damper was removed was visually observed, and graded as follows:

⊙ very good
○ fairly good
△ good
× bad
×× very bad

4. Blocking resistance:

Ten g of sample resin powders were put in a cylindrical vessel and a pressure of 0.175 kg/cm$^2$ was applied for 2 hours at a temperature of 30° C. The blocks thus produced were subjected to vibration by a micro-type electro-magnetic vibrating screen (manufactured by Tsutsui Rikagaku Kikai Co., Ltd.) and the time (sec) required before 60% of the blocks were broken was determined.

5. Impact resistance:

To 100 parts of a sample polyvinyl chloride resin containing a tin type stabilizer were added 10 parts of a rubber-containing graft copolymer or modified rubber-containing graft copolymer to form a compound. This compound was subjected to profile extrusion using an extruder having an inner diameter of 25 mm$\phi$ to obtain a test piece. The Izod impact strength of this test piece was evaluated according to ASTM-D256-87.

6. Number of fish eyes:

Using the compound described in paragraph 3 above, a film with a thickness of 0.1 mm was extruded by an extruder having an inner diameter of 30 mm$\phi$, and a shorter film of 10 cm × 7 cm was cut out of the original film. The number of fish eyes in the shorter film was counted.

EXAMPLE 1

1) Preparation of a butadiene rubber-containing graft copolymer (A-1)

| | |
|---|---|
| 1,3-butadiene (Bd) | 80 parts |
| styrene (St) | 20 parts |
| divinylbenzene | 1 part |
| ferrous sulfate | 0.006 part |
| sodium pyrophosphate | 0.6 part |
| diisopropylbenzene hydroperoxide | 0.4 part |
| dextrose | 0.4 part |
| potassium oleate | 1 part |
| deionized water | 200 parts |

Each component of the charge having the composition listed above was introduced into a high pressure resistant autoclave and subjected to reaction under stirring for 48 hours at a temperature of 50° C. to obtain a latex of a butadiene rubber polymer (rate of polymerization ratio was 98%). After 1 part of sodium chloride had been added to 70 parts (as solid content) of a latex of the butadiene rubber polymer thus obtained, a monomer mixture of 13 parts of methyl methacrylate with 2 parts of ethyl acrylate, 0.045 part of cumene hydroperoxide, and 0.06 part of formaldehydesodium sulfoxylate were further added, and the resulting mixture was subjected to a first stage graft polymerization for 2 hours at a temperature of 70° C. Subsequently, after a mixture of 15 parts of styrene and 0.06 part of cumene hydroperoxide, as a charge for a second stage graft polymerization, had been added to the reaction liquid obtained by the first graft polymerization, the resulting mixture was subjected to a second stage graft polymerization for 3 hours at a temperature of 70° C. in the presence of the graft polymer obtained in the previous stage to obtain a latex (solid content: 100 parts) of a butadiene rubber-containing graft copolymer (A-1).

2) Preparation of a rigid non-elastic polymer (B-1)

In a reactor equipped with a stirrer and a reflux condenser was introduced a mixture consisting of 900 parts of deionized water, 1 part of sodium dioctylsulfosuccinate, 0.2 part of ammonium persulfate, 95 parts of methyl methacrylate, 5 parts of butyl acrylate, and 0.2 part of n-octyl mercaptan, and the air in the reactor was purged with nitrogen gas. Then, the liquid mixture in the reactor was heated up to a temperature of 65° C. under stirring and kept at that temperature for 2 hours while stirring for polymerization to obtain a latex of a rigid non-elastic polymer (B-1).

Tg and Mw of the rigid non-elastic polymer (B-1) were determined and the results are shown in Table 1.

3) Mixing of the butadiene rubber-containing graft copolymer (A-1) with the rigid non-elastic polymer (B-1)

One hundred parts (as solid content) of the latex of the butadiene rubber-containing graft copolymer (A-1) prepared in 1) above was added to 500 parts of 0.2% by weight aqueous sulfuric acid solution under stirring at a temperature of 40° C. to coagulate the latex and thus to convert it into a slurry. To the slurry thus obtained was added 2 parts (as solid content) of the latex of the rigid non-elastic polymer (B-1) prepared in 2) above to coagulate. The coagulated liquid mixture was heated up to a temperature of 80° C., and then dehydrated and dried to obtain powders of a modified butadiene rubber-containing graft copolymer.

EXAMPLE 2

Two kinds of slurries obtained by coagulating (i) a latex of the butadiene rubber-containing graft copolymer (A-1) prepared in Example 1-1) and (ii) a latex of the rigid non-elastic polymer (B-1) prepared in Example 1-2), separately with 0.2% by weight aqueous sulfuric acid solution at a temperature of 40° C., were mixed together and the mixture thus obtained was heated up to a temperature of 80° C. to be solidified, whereafter the solidified mixture was dehydrated and dried to obtain powders of a modified butadiene rubber-containing graft copolymer.

The mixing was effected such that the amount of the added rigid non-elastic polymer (B-1) was 2 parts based on 100 parts of the butadiene rubber-containing graft copolymer (A-1).

Comparative Example 1

One hundred parts (as solid content) of the latex of the butadiene rubber-containing graft copolymer (A-1) prepared in Example 1-1) were added under stirring to 500 parts of 0.2% by weight aqueous sulfuric acid solution to subject it to coagulation and thus to convert the latex into a slurry. Only the slurry thus obtained was heated up to a temperature of 80° C. to be solidified, and the solid thus formed was dehydrated and dried to obtain resin powders.

Comparative Example 2

The latex of the butadiene rubber-containing graft copolymer (A-1) prepared in Example 1-1) and the latex of the rigid non-elastic polymer (B-1) prepared in Example 1-2) were mixed in a latex state and subjected to coagulation with 0.2% by weight aqueous sulfuric acid solution at a temperature of 40° C. to form a slurry. The slurry was solidified, and the solid thus formed was dehydrated and dried to obtain resin powders.

The mixing was effected such that the amount of the added rigid non-elastic polymer (B-1) was 2 parts based on 100 parts of the butadiene rubber-containing graft copolymer (A-1).

The powder properties of the respective resin powders obtained in Examples 1 and 2, and Comparative Examples 1 and 2 as well as the performances of these resin powders as an impact modifier for a polyvinyl chloride resin were evaluated, and the results are shown in Table 1.

As is apparent from the results shown in Table 1, in Comparative Examples 1 and 2, the powder fluidity of the resin powders is very bad, and the blocking resistance thereof is also bad. On the other hand, in Examples 1 and 2, the powder fluidity is good, and the blocking resistance was improved to such an extent that the resin powders are hardly blocked. In addition, in the aspect of physical properties of the resin powders, both the extent of improvement in the impact resistance by the rubber-containing graft copolymer and the number of fish eyes produced when the modified rubber-containing graft copolymer was blended with a polyvinyl chloride resin in Examples 1 and 2 are the same rank as those in Comparative Examples 1 and 2. Thus, an adverse effect by the addition of a rigid non-elastic polymer was not observed.

Examples 3 to 5

Latexes of rigid non-elastic polymers were obtained in the same manner as in Example 1-2) except that the solid content was adjusted to 20% (B-2: Example 3), 5% (B-3: Example 4), or 25% (B-4: Example 5).

Using 100 parts (as solid content) of the latex of the butadiene rubber-containing graft copolymer A-1) prepared in Example 1-1) and 2 parts (as solid content) of each of the latexes of the rigid non-elastic polymers (B-2), (B-3), and (B-4), the same procedures as in Example 1-3) were repeated to obtain 3 kinds of powders of modified butadiene rubber-containing graft copolymers.

As is apparent from the results shown in Table 1, when the solid content in a rigid non-elastic polymer latex is 20% or less, the effect in improving the powder properties of a rubber-containing graft copolymer is large.

Examples 6 to 8 and Comparative Examples 3 and 4

The procedure in Example 1-3) was repeated to obtain 5 kinds of powders of modified butadiene rubber-containing graft copolymers except that the amount of the rigid non-elastic polymer (B-1) to be added in the mixing of the butadiene rubber-containing graft copolymer (A-1) and the rigid non-elastic polymer (B-1) in the procedure of Example 1-3) was changed to 0.3 part (Example 6), 5 parts (Example 7), 9 parts (Example 8), 0.05 part (Comparative Example 3), or 12 parts (Comparative Example 4).

The powder properties of the resin powders obtained in Examples 6 to 8 and Comparative Examples 3 and 4, respectively, and the performances of the resin powders as an impact modifier for a polyvinyl chloride resin were evaluated, and the results are shown in Table 1.

As is apparent from the results in Table 1, the extent of the improvement of the powder fluidity and blocking resistance will increase with increasing of the amount of the added rigid non-elastic polymer (B-1), but when the amount exceeds 10 parts (Comparative Example 4), the effect of the rubber-containing graft copolymer in increasing the impact resistance will be lowered. Conversely, when the amount is less than 0.1 part (Comparative Example 3), the effect of improving the powder properties of a rubber-containing graft copolymer becomes insufficient.

EXAMPLE 9

In a reactor equipped with a stirrer and a reflux condenser was charged a mixture consisting of 900 parts of deionized water, 1 part of sodium dioctylsulfosuccinate, 0.2 part of ammonium persulfate, 50 parts of methyl methacrylate, 50 parts of styrene, and 0.3 part of n-octyl mercaptan, the air in the reactor was purged with nitrogen gas, and the liquid mixture in the reactor was heated up to a temperature of 65° C. under stirring and kept at the temperature for 2 hours while stirring to polymerize the monomers whereby a latex of a rigid non-elastic polymer (B-5) was obtained.

Tg and Mw of the rigid non-elastic polymer (B-5) were determined, and the results are shown in Table 1.

Using 100 parts (as solid content) of the latex of the butadiene rubber-containing graft copolymer (A-1) prepared in Example 1-1) and 2 parts (as solid content) of the latex of the rigid non-elastic polymer (B-5) prepared in the procedure mentioned above, the same procedures as in Example 1-3) were repeated to obtain powders of a modified butadiene rubber-containing graft copolymer resin. The powder properties of the resin powders thus obtained and the performances of the powders as an impact modifier for a polyvinyl chloride resin were evaluated, and the results are shown in Table 1.

EXAMPLE 10

In a reactor equipped with a stirrer and a reflux condenser was charged a mixture consisting of 900 parts of deionized water, 1 part of sodium dioctylsulfosuccinate, 0.2 part of ammonium persulfate, 50 parts of methyl methacrylate, 45 parts of styrene, and 0.3 part of n-octyl mercaptan, the air in the reactor was purged with nitrogen gas, and the liquid mixture in the reactor was heated up to a temperature of 65° C. under stirring and kept at the temperature for 2 hours while stirring to polymerize the monomers whereby a latex of a rigid non-elastic polymer (B-6) was obtained.

Tg and Mw of the rigid non-elastic polymer (B-6) were determined, and the results are shown in Table 1.

Using 100 parts (as solid content) of the latex of the butadiene rubber-containing graft copolymer (A-1) prepared in Example 1-1) and 2 parts (as solid content) of the latex of the rigid non-elastic polymer (B-6) obtained in the procedure mentioned above, the same procedures as in Example 1-3) were repeated to obtain powders of a modified butadiene rubber-containing graft copolymer. The powder properties of the resin powders thus obtained and the performances of the resin powders as an impact modifier for a polyvinyl chloride resin were evaluated, and the results are shown in Table 1.

EXAMPLE 11

In a reactor equipped with a stirrer and a reflux condenser was charged a mixture consisting of 900 parts of deionized water, 1 part of sodium dioctylsulfosuccinate, 0.2 part of ammonium persulfate, 40 parts of methyl methacrylate, 18 parts of butyl acrylate, and 0.2 part of n-octyl mercaptan, the air in the reactor was purged with nitrogen gas, and the liquid mixture in the reactor was heated up to a temperature of 65° C. under stirring and kept at the time for 2 hours while stirring to polymerize the monomers. Subsequently, a mixture of 37 parts of methyl methacrylate with 5 parts of butyl acrylate was added over 1 hour. After the finish of the addition of monomers, heating of the liquid mixture was continued for 2 hours under stirring to complete the polymerization to obtain a latex of a rigid non-elastic polymer (B-7).

Tg and Mw of the rigid non-elastic two-stages polymer (B-7) were determined, and the results are shown in Table 1.

Using 100 parts (as solid content) of the latex of the butadiene rubber-containing graft copolymer (A-1) prepared in Example 1-1) and 2 parts (as solid content of the rigid non-elastic two-stages polymer (B-7) prepared in the procedure mentioned above, the same procedures as in Example 1-3) were repeated to obtain powders of a modified butadiene rubber-containing graft copolymer. The powder properties of the resin powders thus obtained and the performances of the resin powders as an impact modifier for a polyvinyl chloride were evaluated, and the results are shown in Table 1.

Examples 12 to 13 and Comparative Example 5 to 6

Example 9 was repeated except that the amount of n-octyl mercaptan was varied to obtain latexes of 4 kinds of rigid non-elastic polymers having a Mw of 200,000 (B-8, Example 12), 450,000 (B-9, Example 13), 8,000 (B-10, Comparative Example 5), or 600,000 (B-11, Comparative Example 6).

Tg of each rigid non-elastic polymer was determined, and the results are shown in Table 1.

Using 100 parts (as solid content) of the latex of the butadiene rubber-containing graft copolymer (A-1) prepared in Example 1-1) and 2 parts each (as solid content) of the latexes of the rigid non-elastic polymer prepared in the procedure mentioned above, the same procedures as in Example 1-3) were repeated to obtain 4 kinds of powders of modified butadiene rubber-containing graft copolymers.

Comparative Example 7

In a reactor equipped with a stirrer and a reflux condenser was charged a mixture consisting of 900 parts of deionized water, 1 part of sodium dioctylsulfosuccinate, 0.2 part of ammonium persulfate, 95 parts of methyl methacrylate, 5 parts of butyl acrylate, and 0.02 part of n-octyl mercaptan, the air in the reactor was purged with nitrogen gas, and the liquid mixture in the reactor was heated up to a temperature of 65° C. under stirring and kept at the temperature for 2 hours while stirring to polymerize, whereby a latex of a rigid non-elastic polymer (B-12) was obtained.

Tg and Mw of the rigid non-elastic polymer (B-12) were evaluated, and the results are shown in Table 1

Two kinds of slurries prepared by coagulating (i) 100 parts (as solid content) of the latex of the butadiene rubber-containing graft copolymer (A-1) prepared in Example 1-1) and (ii) 2 parts (as solid content) of the latex of the rigid non-elastic polymer (B-12) prepared in the procedure mentioned above separately with 0.2% by weight aqueous sulfuric acid solution at 40° C. were mixed, and the slurry mixture was heated up to a temperature of 80° C. to be solidified. The solid thus prepared was dehydrated and dried to obtain powders of a modified butadiene rubber-containing graft copolymer.

In this Comparative Example, the amount of the added rigid non-elastic polymers (B-12) was adjusted to 2 parts based on 100 parts of the butadiene rubber-containing graft copolymer (A-1).

The powder properties of the resin powders obtained in Examples 11 to 13 and Comparative Examples 5 to 7, and performances of the resin powders as an impact modifier for a polyvinyl chloride resin were evaluated and the results are shown in Table 1.

As is apparent from the results in Table 1, when the Mw of a rigid non-elastic polymer is less than 10,000 (Comparative Example 5), the effect in improving the powder fluidity and blocking resistance become insufficient. Conversely, when Mw exceeds 500,000 (Comparative Examples 6 and 7), very many fish eyes are produced when a modified rubber-containing graft copolymer is blended with a polyvinyl chloride resin and used in practice, and the effect of a rubber-containing graft copolymer in improving the impact resistance is impaired.

Comparative Example 8

In a reactor equipped with a stirrer and a reflux condenser was charged a mixture consisting of 900 parts of deionized water, 1 part of sodium dioctylsulfosuccinate, 0.2 part of ammonium persulfate 65 parts of methyl methacrylate, 35 parts of butyl acrylate, and 0.2 part of n-octyl mercaptan, the air in the reactor was purged with nitrogen gas, and the liquid mixture in the reactor was heated up to a temperature of 65° C. under stirring and kept at the temperature for 2 hours while stirring to polymerize the monomers, whereby a latex of a rigid non-elastic polymer (B-3) was obtained.

Tg and Mw of the rigid non-elastic polymer (B-13) were determined, and the results are shown in Table 1.

Using 100 parts (as solid content) of the latex of the butadiene rubber-containing graft copolymer (A-1) prepared in Example 1-1) and 2 parts (as solid content) of the latex of rigid non-elastic polymer (B-13) prepared in the procedure mentioned above, the same procedures as in Example 1-3) were repeated to obtain powders of a modified butadiene rubber-containing graft copolymer. The powder properties of the resin powders thus obtained and the performances of the resin powders as an impact modifier for a polyvinyl chloride resin were evaluated, and the results are shown in Table 1.

TABLE 1

| | Rigid non-elastic polymer (B) | | | | | | | Amount of added (B) (parts) | Powder fluidity | Blocking resistance (sec) | Impact resistance (kg · cm/ $cm^2$) | Number of fish eyes |
|---|---|---|---|---|---|---|---|---|---|---|---|---|
| | | composition (parts) | | | | Latex solid content (%) | Mixing of (A) and (B) | | | | | |
| | Name | 1st stage | 2nd stage | Tg (°C.) | Mw × $10^4$ | | | | | | | |
| Example 1 | B-1 | M/B 95 5 | — | 92 | 30 | 10 | Slurry(A) and latex(B) | 2 | | 2 | 85 | 18 |
| Example 2 | B-1 | M/B 95 5 | — | 92 | 30 | 10 | Slurry(A) and slurry(B) | 2 | ⊙ | 10 | 83 | 21 |
| Comparative Example 1 | — | — | — | — | — | — | — | — | XX | 210 | 87 | 15 |

TABLE 1-continued

| | Rigid non-elastic polymer (B) | | | | | Mixing of (A) and (B) | Amount of added (B) (parts) | Powder fluidity | Blocking resistance (sec) | Impact resistance (kg · cm/ cm$^2$) | Number of fish eyes |
|---|---|---|---|---|---|---|---|---|---|---|---|
| | | composition (parts) | | | | | | | | | |
| | Name | 1st stage | 2nd stage | Tg (°C.) | Mw × 10$^4$ | Latex solid content (%) | | | | | |
| Comparative Example 2 | B-1 | M/B 95 5 | — | 92 | 30 | 10 | Latex(A) and latex(B) | 2 | XX | 190 | 82 | 18 |
| Example 3 | B-2 | M/B 95 5 | — | 92 | 30 | 20 | Slurry(A) and latex(B) | 2 | ○ | 28 | 86 | 16 |
| Example 4 | B-3 | M/B 95 5 | — | 92 | 30 | 5 | Slurry(A) and latex(B) | 2 | ◉ | 3 | 88 | 19 |
| Example 5 | B-4 | M/B 95 5 | — | 92 | 30 | 25 | Slurry(A) and latex(B) | 2 | ○ | 54 | 84 | 15 |
| Example 6 | B-1 | M/B 95 5 | — | 92 | 30 | 10 | Slurry(A) and latex(B) | 0.3 | ○ | 51 | 89 | 12 |
| Example 7 | B-1 | M/B 95 5 | — | 92 | 30 | 10 | Slurry(A) and latex(B) | 5 | ◉ | No blocking | 79 | 20 |
| Example 8 | B-1 | M/B 95 5 | — | 92 | 30 | 10 | Slurry(A) and latex(B) | 9 | ◉ | No blocking | 73 | 27 |
| Comparative Example 3 | B-1 | M/B 95 5 | — | 92 | 30 | 10 | Slurry(A) and latex(B) | 0.05 | X | 180 | 86 | 13 |
| Comparative Example 4 | B-1 | M/B 95 5 | — | 92 | 30 | 10 | Slurry(A) and latex(B) | 12 | ◉ | No blocking | 18 | 45 |
| Example 9 | B-5 | M/S 50 50 | — | 102 | 10 | 10 | Slurry(A) and latex(B) | 2 | ◉ | 2 | 80 | 23 |
| Example 10 | B-6 | M/S/B 50 45 5 | — | 90 | 10 | 10 | Slurry(A) and latex(B) | 2 | ◉ | 4 | 82 | 16 |
| Example 11 | B-7 | M/B 40 18 | M/B 37 5 | 51 | 40 | 10 | Slurry(A) and latex(B) | 2 | ○ | 70 | 87 | 12 |
| Example 12 | B-8 | M/S 50 50 | — | 102 | 20 | 10 | Slurry(A) and latex(B) | 2 | ○ | 2 | 78 | 23 |
| Example 13 | B-9 | M/S 50 50 | — | 102 | 45 | 10 | Slurry(A) and latex(B) | 2 | ◉ | No blocking | 70 | 31 |
| Comparative Example 5 | B-10 | M/S 50 50 | — | 102 | 0.8 | 10 | Slurry(A) and latex(B) | 2 | X | 185 | 87 | 12 |
| Comparative Example 6 | B-11 | M/S 50 50 | — | 102 | 60 | 10 | Slurry(A) and latex(B) | 2 | ◉ | No blocking | 21 | 163 |
| Comparative Example 7 | B-12 | M/B 95 5 | — | 92 | 100 | 10 | Slurry(A) and slurry(B) | 2 | ◉ | 4 | 30 | 181 |
| Comparative Example 8 | B-13 | M/B 65 35 | — | 28 | 45 | 10 | Slurry(A) and latex(B) | 2 | X | 165 | 89 | 13 |

M: methyl methacrylate
B: butyl acrylate
S: styrene
(A): rubber-containing graft copolymer
(B): rigid non-elastic polymer As is apparent from the results in Table 1, when Tg of a rigid non-elastic polymer is 40° C. or higher, the powder fluidity and blocking resistance are excellent with either one-stage polymer or two-stage polymer, while when Tg is lower than 40° C. (Comparative Example 8), so the effect in improving the powder fluidity and blocking resistance becomes insufficient.

We claim:

1. A process for producing rubber-containing graft copolymer particles having excellent powder properties, comprising mixing, with 100 parts by weight (as solid content) of a slurry of a rubber-containing graft copolymer (A), 0.1 to 10 parts by weight (as solid content) of a rigid non-elastic polymer (B) having a glass transition temperature of 40° C. or higher and a weight-average molecular weight of 10,000 to 500,000 in a substantially slurry state.

2. A process according to claim 1, wherein the rubber-containing graft copolymer (A) is mixed with the rigid non-elastic polymer (B) in a slurry state by adding a latex of the rigid non-elastic polymer (B) to a slurry of the rubber-containing graft copolymer (A) and then subjecting the latex to coagulation.

3. A process according to claim 2, wherein the solid content of the latex of the rigid non-elastic polymer (B) is 20% or less.

4. A process according to claim 2, wherein the solid content of the latex of the rigid non-elastic polymer (B) is 15% or less.

5. A process according to claim 1, wherein the glass transition temperature of the rigid non-elastic polymer (B) is 60° C. or higher.

6. A process according to claim 1, wherein the weight-average molecular weight of the rigid non-elastic polymer (B) is from 50,000 to 350,000.

7. A process according to claim 1, wherein 0.5 to 5 parts by weight (as solid content) of the rigid non-elastic polymer (B) is added to 100 parts by weight (as solid content) of the slurry of the rubber-containing graft copolymer (A).

8. A process according to claim 7, wherein 1 to 3 parts by weight (as solid content) of the rigid non-elastic polymer (B) is added to 100 parts by weight (as solid content) of the slurry of the rubber-containing graft copolymer (A).

* * * * *